(No Model.)
L. G. ROSE & D. S. MOOERS.
RUT CUTTER FOR LOGGING ROADS.
No. 438,829. Patented Oct. 21, 1890.
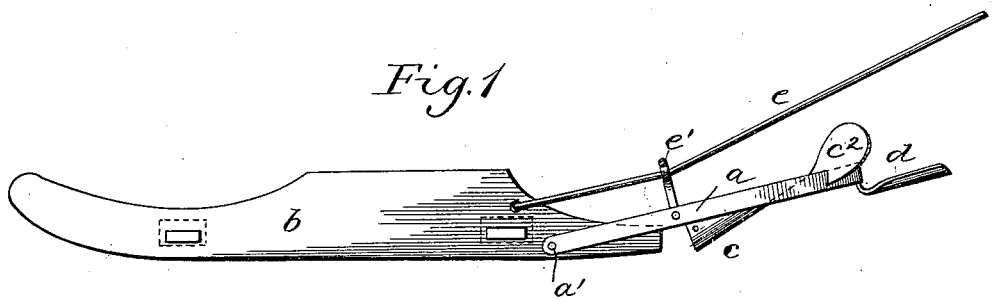
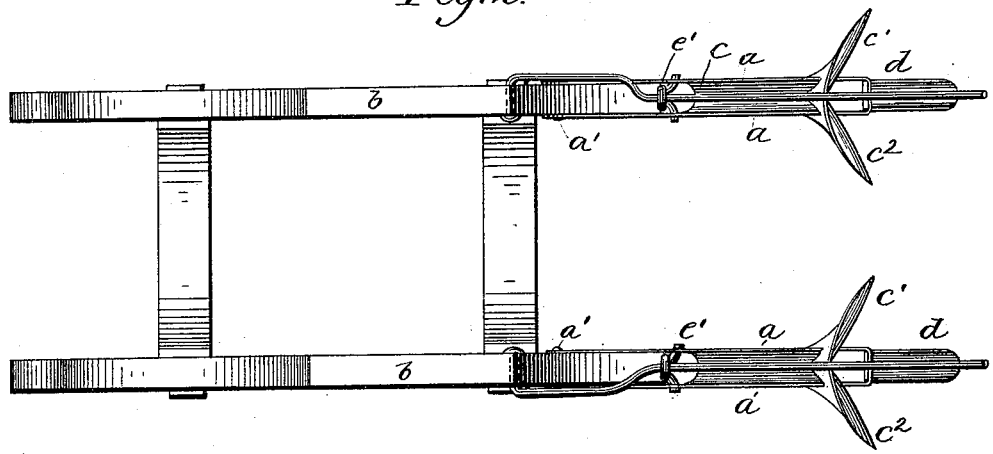
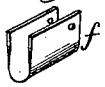

UNITED STATES PATENT OFFICE.

LUCIOUS GAMALIEL ROSE AND DANIEL S. MOOERS, OF FORT RIPLEY, MINNESOTA.

RUT-CUTTER FOR LOGGING-ROADS.

SPECIFICATION forming part of Letters Patent No. 438,829, dated October 21, 1890.

Application filed February 17, 1890. Serial No. 340,746. (No model.)

*To all whom it may concern:*

Be it known that we, LUCIOUS GAMALIEL ROSE and DANIEL S. MOOERS, citizens of the United States, residing at Fort Ripley, in the county of Crow Wing and State of Minnesota, have invented certain new and useful Improvements in Rut-Cutting for Logging-Roads; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to a rut-cutter; and it consists in a shoe provided with a proper plow and having wing or wings to either or both sides, a gage to determine the depth of the cut, and a lever to operate the said cutter, which is attached to the rear end of one or both of the runners of a sleigh or sled.

In the accompanying drawings, Figure 1 is a side view of our invention with the plows removed. Fig. 2 is a plan view of Fig. 1. Fig. 3 is a perspective view of one of the plows used and to be attached to the shoe.

Our invention is described as follows: A bar $a$ of iron is bent in U shape, bringing the two free ends immediately opposite each other and pivoting them by a bolt $a'$ to the rear end of the runner $b$. In that part of the opening behind the rear end of the runner between the parallel parts of the bar $a$ is secured a shoe $c$, the front end of which extends down a few inches below the lower edge of said bar, and its upper end terminates at the upper edge of said bar and very near the U bend of the same, and to the upper end of said shoe is attached right and left wings $c'$ and $c^2$, to throw the dirt cut from the rut to the right and left. In the U bend of said bar is adjusted a guide $d$ to determine the depth of the cut. Above and a little in advance of the pivoted ends of the pivoted ends of the bar $a$ is pivoted in the runner $b$ a lever $e$. Said lever is attached to the bar $a$ by a wire $e'$, the upper end of which is formed into an eye, through which said lever runs, and the lower ends are turned out and pivoted in the said bar immediately in the rear of the runner.

The rut-cutter is a thing by itself and can be attached to any sleigh or sled in the manner above described. Each cutter may be independent, if desired, or one may be attached to each runner, or only one at a time may be used, in which case a road would have to be gone over in both directions to cut the two ruts. These ruts are to be cut in logging-roads, one on each side, for the sled-runners to run in. In case there is not a sufficient amount of snow on the ground ruts are thus cut and a sprinkler run over them, the water on freezing will make good sledding without any snow.

The plow $f$ is made separate from the shoe $c$, so that in case one of the plows gets damaged a new one can be put on without interfering with the other part of the invention.

The plows may be put on by bolts or any of the methods known for attaching plow-points to plows. The wings $c'$ and $c^2$ may both be used and the dirt thrown to each side of the rut, or one wing alone may be used and all the dirt thrown to one side. The sled or cutter may be provided with a suitable seat or stand for the operator to stand or sit on, and it may also be provided, if desired, with an upright notched bar for the lever $e$ to rest in, to hold the cutter up from the ground at any angle desired or down parallel with the line of the runner.

Having described our invention, what we claim as new, and desire to secure by Letters Patent, is—

In combination with the runner $b$, the U-shaped bar $a$, having its free ends pivoted to the rear end of said runner by the bolt $a'$, shoe $c$, secured between the arms of said bar, wings $c'$ and $c^2$, secured to the rear end of said shoe, gage $d$, secured in the U end of said bar, lever $e$, its front end pivoted in the rear end of the runner $b$, its rear end extending back beyond the gage $d$, wire $e'$, securing said lever to said bar $a$, and plow $f$, secured to the front end of said shoe $c$, substantially as shown and described, and for the purposes set forth.

In testimony whereof we affix our signatures in presence of two witnesses.

LUCIOUS GAMALIEL ROSE.
DANIEL S. MOOERS.

Witnesses:
C. B. CLOUSE,
N. RICHARDSON.